(12) United States Patent
Santilli

(10) Patent No.: US 6,687,908 B1
(45) Date of Patent: Feb. 3, 2004

(54) INTERACTIVE TELEVISION

(75) Inventor: Daniele Santilli, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/306,962

(22) Filed: May 7, 1999

(30) Foreign Application Priority Data

May 8, 1998  (EP) ............................................ 98201511

(51) Int. Cl.[7] ........................... H04N 7/08; H04N 7/084
(52) U.S. Cl. ........................................ 725/137; 348/478
(58) Field of Search ............................... 725/121–126, 725/137; 348/468, 478; 709/219

(56) References Cited

U.S. PATENT DOCUMENTS

| | | | | |
|---|---|---|---|---|
| 4,075,422 A | * | 2/1978 | Baker ........................ | 178/23 R |
| 4,614,971 A | * | 9/1986 | Maney et al. ................ | 348/466 |
| 4,697,046 A | * | 9/1987 | Geerings et al. ............ | 178/1 |
| 4,924,303 A | * | 5/1990 | Brandon ...................... | 725/116 |
| 5,014,125 A | * | 5/1991 | Pocock ........................ | 725/93 |
| 5,991,811 A | * | 11/1999 | Ueno et al. ................. | 709/231 |

FOREIGN PATENT DOCUMENTS

| | | | |
|---|---|---|---|
| EP | 0396062 A2 | 11/1990 | .......... H04N/7/173 |
| WO | WO9638984 | 12/1996 | .......... H04N/7/173 |

* cited by examiner

Primary Examiner—Vivek Srivastava
Assistant Examiner—Hunter B. Lonsberry
(74) Attorney, Agent, or Firm—Laurie E. Gathman

(57) ABSTRACT

An interactive television system for selectively retrieving video images or teletext pages from a remote transmitter (1). User requests are communicated to the transmitter through the telephone network (5). The selected images (e.g. teletext pages) are provided with an image address (a personal teletext page number) and transmitted through a broadcast medium (4). A broadcast receiver (6) captures, stores and displays images having a particular address in a further autonomous manner. In order to prevent co-viewers from tracing the image address and thus watching personal information intended for an individual user on their broadcast receivers (3), the service provider sends a control command (the teletext "stop" command) to the receiver through the network whenever a new image has been transmitted. Then, the provider broadcasts a different image having the same image address. In view of the stop command, the individual receiver will ignore this "pseudo-image" while this image will.

4 Claims, 2 Drawing Sheets

INTERACTIVE TELEVISION

BACKGROUND OF THE INVENTION

1. Field of the Invention

The invention relates to a method of transmitting images from a transmitter to an individual receiver, comprising the steps of establishing a communication path between said receiver and the transmitter to obtain user selections identifying the images to be transmitted, assigning an image address to the images to be transmitted, and broadcasting each image along with said image address through a broadcast medium.

The invention also relates to a corresponding method of receiving such images from a transmitter.

2. Description of the Related Art

A known interactive television transmission system is disclosed in International Patent Application WO 96/38984, corresponding to U.S. Pat. No. 5,821,982. In this prior art system, the images are teletext pages. A user establishes a connection with a service provider via a communication path (often a telephone connection). The user's television receiver is tuned to a predetermined television station and set in the teletext mode. The service provider informs the user, by conventional speech, of a personal teletext page number and requests him to enter this number on his hand-held remote control unit. Subsequently, every time the user requests a new piece of information by means of the telephone keys, the requested page is updated and transmitted with the assigned personal page number. The receiver is arranged to continuously acquire the teletext page having said personal page number. Accordingly, whenever the page is updated and retransmitted, it will be captured and displayed by the receiver.

The teletext page for an individual user and similar pages for further individual users are transmitted along with other teletext pages constituting a regular teletext service. Other users may tune to the same transmitter and try to trace the personal page number of an interactively operating user. Since a teletext page number has a limited range (100—899) and the page numbers of the regular teletext service are known, it is not so difficult to trace such a personal page number. In order to reduce the risk that personal teletext pages appear on the display screen of "co-viewers", the prior-art patent application teaches the feature of extending the personal page number with a sub-code. By broadcasting a pseudo-page having the same page number but a different sub-code immediately after transmitting each personal page, the personal page appears on the display screen of a co-viewer's receiver only for a short time.

As long as the use of interactive teletext is limited to playing a game or offering more general information, "co-viewing" is no practical drawback. However, an interactive teletext application offering personal information should be well protected against the risk of "co-viewing".

The invention is not restricted to transmission of teletext pages. It is also possible to transmit video images at the standard television resolution. An example of such an interactive still image distribution system is disclosed in European Patent Application EP-A-0 396 062, corresponding to U.S. Pat. No. 5,014,125. A multiplicity of still video images requested by various users is transmitted as a standard television signal. Each image is encoded with an address identifying the user for whom it is intended. In this known system, the address is determined by the user terminal and communicated to the service provider through the telephone line. "Co-viewing" is not possible as long as all user terminals have different addresses.

SUMMARY OF THE INVENTION

It is an object of the invention to provide a method and arrangement for interactively transmitting and receiving images which further reduces the risk of "co-viewving".

To achieve this object, the method in accordance with the invention comprises the steps of transmitting, after broadcasting each image, a control command through the communication path to control the receiver to refrain from receiving further images and, through the broadcast medium, a different image having the same image address. The corresponding receiving method is characterized by receiving the control command through the communication path to control the receiver to refrain from receiving further images, and applying said command to the broadcast receiver.

It is achieved with the invention that the individual receiver will ignore the different ("pseudo-)image" whereas this image will overwrite the personal image on the screens of co-viewers.

It is to be noted that remote control of a receiver by a service provider through the communication path is known per se from the afore-cited European Patent Application EP-A-0 396 062. The service provider can send a control message to the user terminal to instruct the television receiver to tune to an alternative channel if the predetermined channel lacks capacity. However, this control message is not a command to control the receiver to refrain from receiving further images and does not reduce the risk of "co-viewing".

In a practical embodiment of the receiver, the communication means (usually an interface to the public switched telephone network) may be integrated in a television receiver. However, to allow conventional television receivers to be used for accessing an interactive (teletext) service, the communication means may be a separate interface box comprising an (infrared) output for applying the image address in the form of conventional remote control commands.

BRIEF DESCRIPTION OF THE DRAWINGS

FIG. 1 shows a system to explain the method in accordance with the.

DESCRIPTION OF THE PREFERRED EMBODIMENTS

The invention will now be explained with reference to an interactive teletext service in which selected teletext pages are transmitted to individual users. It is recalled, however, that the invitation equally applies to other services, such as the transmission of still video images described in EP-A-0 396 062.

Figure 1:
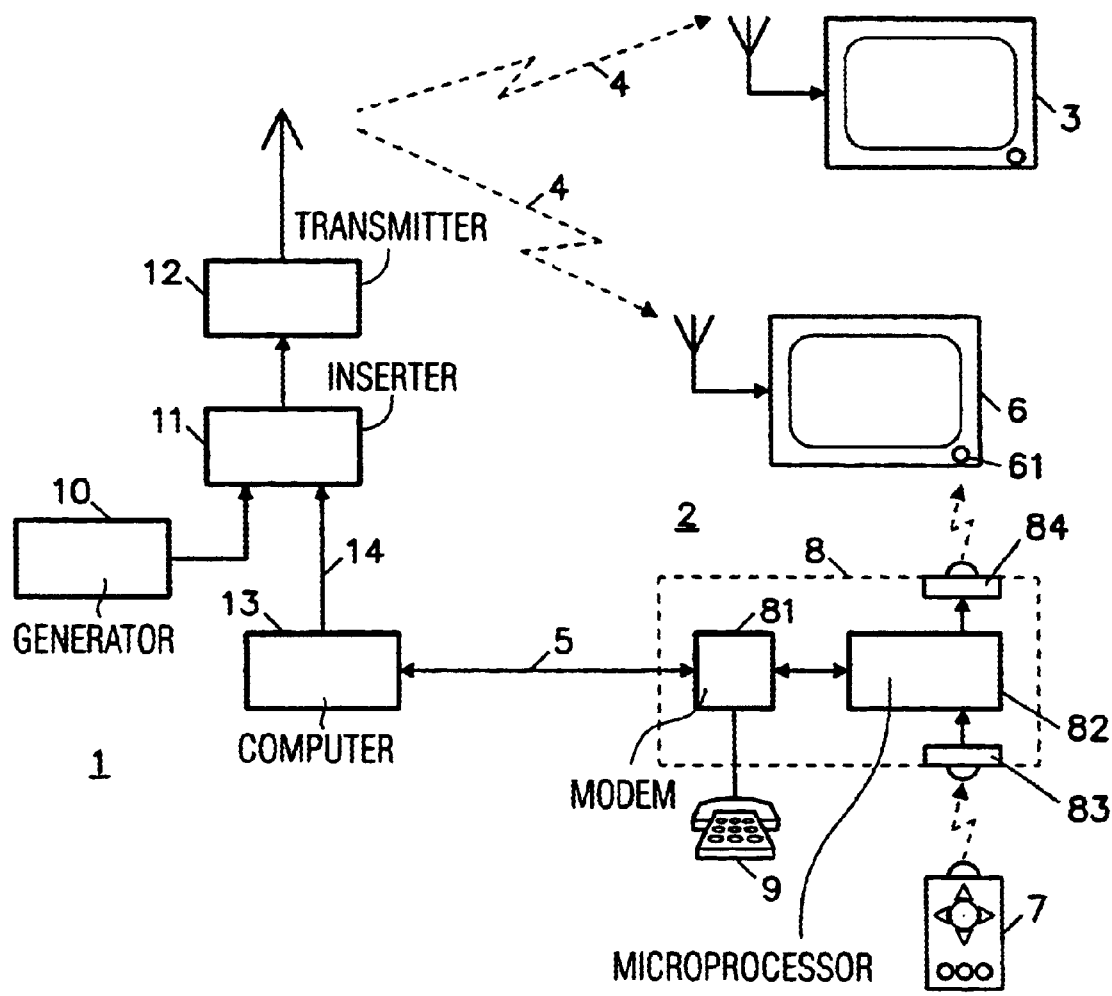

FIG. 1 shows a preferred embodiment of a system for carrying out the method in accordance with the invention. The system comprises a transmitter 1 and an individual receiver 2. A conventional television receiver 3 representing a "co-viewer" is also shown in this Figure. "Conventional" here means that the receiver has a teletext decoder and is arranged to capture and display teletext pages having a page number that has been entered by the user.

The transmitter 1 comprises a teletext generator 10 for generating and storing "regular" teletext pages (i.e, pages accessible to everyone). The teletext pages are applied to a teletext inserter 11 and transmitted by a television transmitter 12. A computer 13 is connected to the teletext inserter 11 by means of a connection 14. The connection 14 may be a local connection. The computer 13 may, however, also be present at a completely different location. In that case, connection 14 is a rented data line. The television transmitter 12 transmits a television signal via a broadcast medium 4. The computer 13 is coupled to a public switched telephone network 5.

In the preferred embodiment, the individual receiver 2 comprises a conventional television receiver 6 with an infrared remote control unit 7, a control interface box 8, and a telephone apparatus 9. The control interface box 8 comprises a modem 81 and a microprocessor 82 connected to said modem and further connected to an infrared receiver 83 and an infrared transmitter 84. The control interface box 8 may be integrated in the television receiver 6. In that case, the microprocessor 82 is directly connected to the receiver's internal control circuitry and the infrared receiver 83 and transmitter 84 can be omitted.

The system shown in FIG. 1 operates as follows. The television receiver 6 can be controlled in a conventional manner by aiming the remote control device 7 at the television's infrared receiver 61. It will be assumed that the user has thus tuned the television receiver to television transmitter 12 and activated the teletext mode. One of the regular teletext pages invites him to call a given telephone number, for example, to play a game, consult a horoscope or access a data base. By means of the telephone apparatus 9, a communication path between the user and the service provider's computer 13 is established through the public switched telephone network 5. Further user commands are entered on the remote control device 7 while this device is aimed at the interface box 8. The television receiver is now being controlled by infrared commands issued by the interface box 8. Needless to say that this requires the television receiver 6 and interface box 8 to "see" each other.

Figure 2:
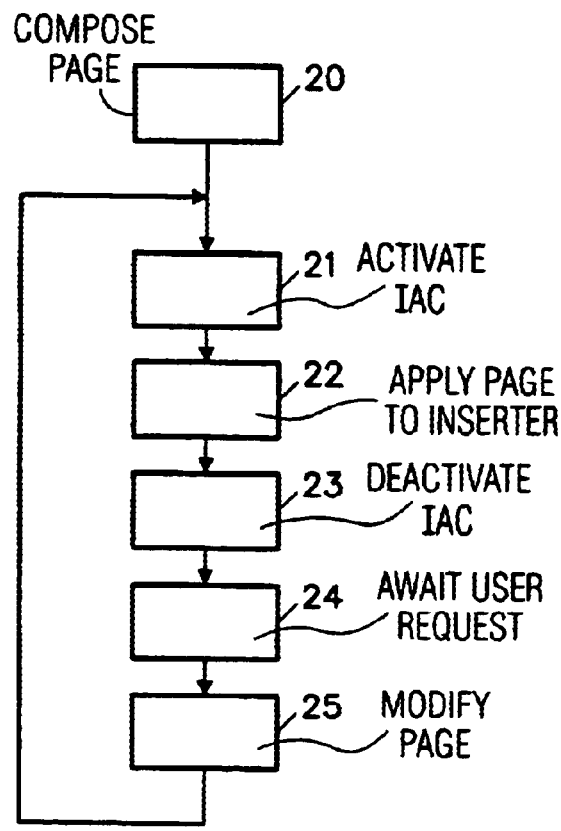
FIG. 2 shows a flowchart of operations performed by a computer at the transmitting end of the system shown in FIG. 1

FIG. 2 shows a flowchart of operations that are subsequently carried out by the computer 13 at the transmitter end. In a step 20, the computer composes a personal teletext page for the user and generates a page number P for said page. The page number P is a random number in the range 100–899 which is not used for the regular teletext service. In a step 21, the computer sends a control command to the receiver through the network 5 to activate the receiver's image acquisition circuitry. In the field of teletext, this command is also known as the "unstop" command. The command may also be the image address, i.e., the teletext page number. Conventional teletext receivers interpret a new page number implicitly as a command to activate the acquisition circuitry. The step 21 includes a short delay. As will be explained hereinafter, this delay allows the receiver to process the command. After the delay, the computer applies the teletext page to the teletext inserter 11 via connection 14 in a step 22. The personal page is now transmitted, in principle once, through the broadcast medium 4 in a further known manner.

The personal page is one of many other pages transmitted by the transmitter 1 and can in principle, be received and displayed by all receivers, including the receiver 3 of a co-viewer. However, other users are ignorant of the presence of this page. This ignorance can be intensified by activating the "out-of-sequence" control bit in the page header of the personal page. The page number may include a sub-code in which case it is a 7-digit number which can less easily be traced by co-viewers.

In a step 23, the computer sends a control command to the receiver through the network 5 to deactivate the receiver's image acquisition circuitry. In the field of teletext, this command is known as the "stop" command and is generally used to "freeze" rotating pages. The step 23 also includes a short delay.

In a step 24, the computer awaits further requests from the user. If such a request is received, the computer modifies the page in a step 25 and returns to the step 21 so as to enable the receiver to capture this page (through the telephone network) and transmit the new page (through the broadcast medium).

Figure 3:
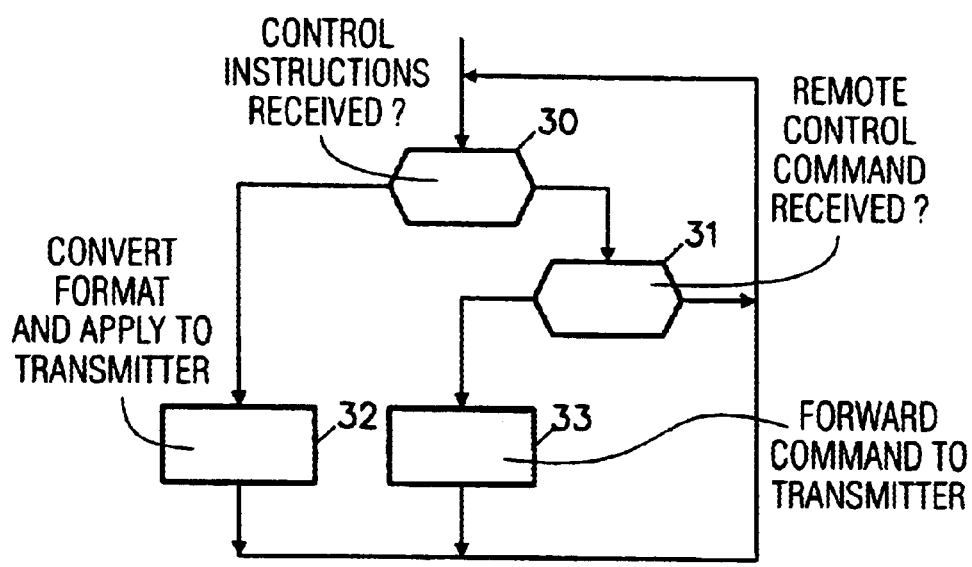
FIG. 3 shows a flowchart of operations performed by a microprocessor at the receiving end of the system shown in FIG. 1.

FIG. 3 shows a flowchart of operations carried out by the microprocessor 82 of interface box 8 at the receiver end. In a step 30, the processor determines whether control instructions (such as a page number, the stop command, the unstop command) are received through the telephone network 5 and the modem 81. In a step 31, the processor determines whether a remote control command is received from the remote control device 7 via the infrared remote control receiver 83. The steps 30 and 31 form a loop which is continuously passed through during the interactive teletext session.

If, in the step 30, a control command is received from the transmitter (cf., the corresponding steps 21 or 24 in FIG. 2), a step 32 is performed in which the microprocessor converts the received command into a conventional remote control format and applies it to the infrared transmitter 84. In response thereto, the television receiver responds as if the user had manually entered the command in a conventional manner. It takes some time (of the order of milliseconds) until the command has been transmitted to the television receiver. To avoid missing the associated teletext page because the page is precisely transmitted in said time interval, the short delay mentioned before has been introduced in the transmitter.

If, in the step 31, a remote control command is received from the remote control device, a step 33 is performed in which said command is forwarded to the transmitter via the modem 81 (cf. the corresponding step 24 in FIG. 2).

In accordance therewith, the transmission of a personal page for an individual user is immediately followed by a "pseudo-page" with the same page number. The individual receiver is not bothered by the pseudo-page because the receiver has meanwhile been instructed to stop the acquisition. If, however, a co-viewer is successful in tracing the personal page number, using the conventional television receiver 3, he will see the personal page for only a very short time because the page will be immediately overwritten by the pseudo-page.

In summary, an interactive television system is disclosed for selectively retrieving video images or teletext pages from a remote transmitter (1). User requests are communicated to the transmitter through the telephone network (5). The selected images (e.g., teletext pages) are provided with an image address (a personal teletext page number) and transmitted through a broadcast medium (4). A broadcast receiver (6) captures, stores and displays images having a particular address in a further autonomous manner. In order to prevent co-viewers from tracing the image address and thus watching personal information intended for an individual user on their broadcast receivers (3), the service provider sends a control command (the teletext "stop" command) to the receiver through the network whenever a new image has been transmitted. Then, the provider broadcasts a different image having the same image address. In view of the stop command, the individual receiver will ignore this "pseudo-image" while this image will overwrite the personal image on the screens of co-viewers.

What is claimed is:

1. A method of transmitting images from a transmitter to an individual receiver, comprising the steps;

establishing a communication path between said individual receiver and the transmitter to obtain user selections identifying the images to be transmitted;

assigning an image address to the images to be transmitted; and broadcasting each image along with said image address through a broadcast medium;

the method further comprises the steps:

transmitting, after broadcasting each image, a control command through the communication path to control the individual receiver to refrain from receiving further images; and subsequently transmitting, through the broadcast medium, a different image having the same image address.

2. A method of receiving selected images from a transmitter, comprising the steps:

establishing a communication path with said transmitter to submit user selections identifying the images to be received;

receiving images having respective image addresses through a broadcast medium; and storing and displaying images having a predetermined image address on a broadcast receiver;

method further comprises the steps:

receiving a control command through the communication path to control the receiver to refrain from receiving further images; and applying said command to the broadcast receiver so that subsequently transmitted images having the same predetermined address are not displayed.

3. A receiver for receiving selected images from a transmitter, comprising:

communication means for establishing a communication path with said transmitter to submit user selections identifying images to be received; and an arrangement for receiving images having respective image addresses through a broadcast medium, and for storing and displaying images having a predetermined image address;

the communication means receives a control command through the communication path to control the arrangement for receiving, storing and displaying images to refrain from receiving subsequently transmitted images, and applies said command to the arrangement for receiving, storing and displaying images.

4. A receiver as claimed in claim 3, wherein the arrangement for receiving, storing and displaying images is a broadcast television receiver comprising an input for receiving remote control user commands, and the communication means comprises an output for applying the control command to the broadcast receiver in the form of said remote control user commands.

* * * * *